United States Patent [19]

Arai et al.

[11] Patent Number: 4,956,730
[45] Date of Patent: Sep. 11, 1990

[54] APPARATUS HAVING A HIGH-SPEED SEARCH CAPABILITY FOR REPRODUCING SIGNALS RECORDED ON A TAPE

[75] Inventors: Kazuo Arai, Hirakata; Kiyoshi Ota, Neyagawa, both of Japan

[73] Assignee: Matsushita Electric Industrial Co., Ltd., Osaka, Japan

[21] Appl. No.: 76,188

[22] Filed: Jul. 21, 1987

[51] Int. Cl.$^5$ .................. G11B 5/53; G11B 15/467
[52] U.S. Cl. ................................ 360/70; 360/72.2; 360/73.06; 360/73.08
[58] Field of Search ............. 360/70, 73, 75, 14.1, 360/8, 9.1, 18, 10.1–10.3, 77, 72.2, 73.04–73.14, 77.12–77.17

[56] References Cited

U.S. PATENT DOCUMENTS

| 4,254,367 | 3/1981 | Sakamoto . | |
|---|---|---|---|
| 4,267,564 | 5/1981 | Flores | 360/73 |
| 4,407,463 | 10/1983 | Ashida | 360/73 |
| 4,448,368 | 5/1984 | Skalko . | |
| 4,584,618 | 4/1986 | Tasery | 360/70 |
| 4,636,874 | 1/1987 | Hoogendoorn et al. | 360/10.2 |
| 4,688,115 | 8/1987 | Takahashi et al. | 360/70 |
| 4,764,824 | 8/1988 | Tani et al. | 360/70 |

FOREIGN PATENT DOCUMENTS

| 0092403 | 10/1983 | European Pat. Off. . |
| 0107166 | 5/1984 | European Pat. Off. . |
| 0131316 | 1/1985 | European Pat. Off. . |
| 0180432 | 5/1986 | European Pat. Off. . |
| 0181942 | 5/1986 | European Pat. Off. . |
| 0196216 | 10/1986 | European Pat. Off. . |
| 0197782 | 10/1986 | European Pat. Off. . |
| 3147596 | 6/1983 | Fed. Rep. of Germany . |
| 7900376 | 7/1979 | Netherlands . |

OTHER PUBLICATIONS

"Servo Technology of R-DAT" by Akihiko Hitomi, et al. (IEEE Transactions on Consumer Electronics, vol. CE-32, No. 3, Aug. 1986, pp. 425–431).
Patent Abstracts of Japan, vol. 8, No. 82 (P-268)[1519], Apr. 14, 1984; JP-A-58-224458, Dec. 26, 1983, J. Ono.
"High Speed Tracking Control for Reel-to-Reel Tape Transport", Nagayama et al.; Review of Electrical Communication Laboratories, vol. 28, No. 5–6, May/Jun. 1980, Tokyo, Japan, pp. 440–448.
Patent Abstracts of Japan, vol. 6, No. 160 (E-126) [1038], Aug. 21, 1982: JP-A-57-80881, May 20, 1982, T. Kawabe.
Patent Abstracts of Japan, vol. 10, No. 101 (P-447)[2158], Apr. 17, 1986; JP-A-60-231952, Nov. 18, 1985, K. Yoshino.

Primary Examiner—Alan Faber
Assistant Examiner—Steven R. Garland
Attorney, Agent, or Firm—Wenderoth, Lind & Ponack

[57] ABSTRACT

An apparatus for reproducing signals recorded in slanting tracks on a recording tape including tape position information recorded at a specified area on each track apparatus has a tape speed setting circuit for setting a plurality of tape speeds, and a cylinder speed setting circuit for setting a rotational speed of a rotary cylinder such that the track direction speed component of a reproducing head mounted on the rotary cylinder is kept constant. A tape running control circuit controls a reel drive circuit so that the tape runs at a speed set by the tape speed setting circuit. A cylinder control circuit controls the rotary cylinder so that the rotary cylinder rotates at a speed set by the cylinder speed setting circuit. In a transition state from a normal reproduction mode to a high speed search mode, the tape speed setting circuit changes the tape speed in a step-wise fashion so that the deviation of the track direction speed component of the head in each step of tape speed change is within a range in which the tape position information is correctly read.

8 Claims, 9 Drawing Sheets

| OUTPUT OF BINARY FULL-ADDER 954 | OUTPUT OF FIXED-VALUE ADDING CIRCUIT 951 | NUMBER OF CLOCKS TO THE CENTER VALUE OF THE COUNTER | DECIMAL EXPRESSION OF THE NUMBER OF CLOCKS |
|---|---|---|---|
| 0 0 0 0 | 0 0 0 1 0 1 0 0 | 0 1 1 0 1 1 0 0 | 1 0 8 |
| 0 0 0 1 | 0 0 0 1 0 1 0 1 | 0 1 1 0 1 0 1 1 | 1 0 7 |
| 0 0 1 0 | 0 0 0 1 0 1 1 0 | 0 1 1 0 1 0 1 0 | 1 0 6 |
| 0 0 1 1 | 0 0 0 1 0 1 1 1 | 0 1 1 0 1 0 0 1 | 1 0 5 |
| 0 1 0 0 | 0 0 0 1 1 0 0 0 | 0 1 1 0 1 0 0 0 | 1 0 4 |
| -------- | -------- | -------- | -------- |
| 1 1 1 0 | 0 1 0 1 0 0 1 0 | 0 0 1 0 1 1 1 0 | 4 6 |
| 1 1 1 1 | 0 1 0 1 0 0 1 1 | 0 0 1 0 1 1 0 1 | 4 5 |

4,956,730

APPARATUS HAVING A HIGH-SPEED SEARCH CAPABILITY FOR REPRODUCING SIGNALS RECORDED ON A TAPE

BACKGROUND OF THE INVENTION

1. Field of the Invention

This invention relates to an apparatus such as a video tape recorder ("VTR" hereinafter) and a digital audio tape recorder("DAT") for reproducing information recorded in slanting tracks on a recording tape such as a magnetic tape.

2. Description of the Prior Art

It is important for a DAT or VTR which can record and play 2 to 8 hours of programs such as music and moving pictures to search a recorded position of desired program quickly.

An example of a search of a position on a tape at high speed ("high speed search" hereinafter) for a DAT is shown in "SERVO TECHNOLOGY OF R-DAT" by Akihiko Hitomi, et al (IEEE Transactions on Consumer Electronics, vol. CE-32, No. 3, August 1986, PP430-431). In the example described in this report, when the tape speed is made 200 times faster than that used in normal reproduction, the speed of the rotary cylinder on which a head is mounted is 3025 r.p.m. in the fast forward ("FF") direction and 994 r.p.m. in the rewind ("REW") direction. This allows the speed component in the track direction of the reproduction head to be equal to that in the normal reproduction so that the head can read tape position information recorded on a track.

By this method, however, it is not assured that the increase of the tape speed coincides with the increase of the rotary cylinder speed in the transition stage when the tape speed is accelerated from the stopped state to a speed 200 times faster than the normal reproduction speed. Therefore, the track direction speed component of the head would become different from that used in the normal reproduction in the transition stage, so that there would be the possibility that the tape position information could not be read.

SUMMARY OF THE INVENTION

An object of this invention is to provide a tape reproduction apparatus which enables a reliable high-speed search without failure for reading tape position information recorded on the track even in the above-described transition stage.

In order to attain the above object, the tape reproducing apparatus according to this invention uses a recording tape on which information signals are recorded in slanting tracks and on which positional information is recorded at a specified position on each track, and comprises:

a rotary cylinder on which a head and a cylinder speed detector is mounted;
a cylinder control means for controlling the rotary cylinder rotation according to an output of the cylinder speed detector;
two reels on which the tape is wound;
two reel rotation detectors for respectively detecting rotational speeds of the two reels;
a tape driving means for driving either of the two reels to run the tape;
a tape running control means for controlling the tape driving means according to outputs of the two reel rotation detectors;
a tape speed setting means for setting a plurality of speeds for the tape running control means:
cylinder speed setting means for setting a cylinder rotational for the cylinder control means to maintain constant a track direction speed component of the head according to tape speed; and
a signal processing circuit for reading the positional information recorded on the tape.

The apparatus controls the tape to run at a plurality of speeds and the rotary cylinder to rotate to maintain the track direction speed component of the head. For example, the tape speed is increased in a step-wise fashion like 1 fold, 25 fold, 50 fold,—up to 200 fold faster than the normal speed, and the rotary cylinder speed follows to increase in a similar step-wise fashion. Accordingly, the track direction speed component of the head will not deviate so significantly from that used in normal reproduction mode, so that a reliable search which is free from failure can be realized.

Furthermore, the tape running speed is controlled according to the outputs of the two reel rotation detectors to eliminate errors in the tape running even when a dropout occurs in the reading by the head. In this case, the tape running speed may vary depending on the tape length, etc. To avoid such a variation, it is preferable to detect the relative speed of the tape with respect to the track by using an output signal of a PLL circuit in the signal processing circuit synchronized with a head reading signal, and to correct the tape speed set for the tape running control means to a correct target value With this arrangement, the position information reading accuracy is further enhanced.

DESCRIPTION OF THE PREFERRED EMBODIMENTS

Figure 1:
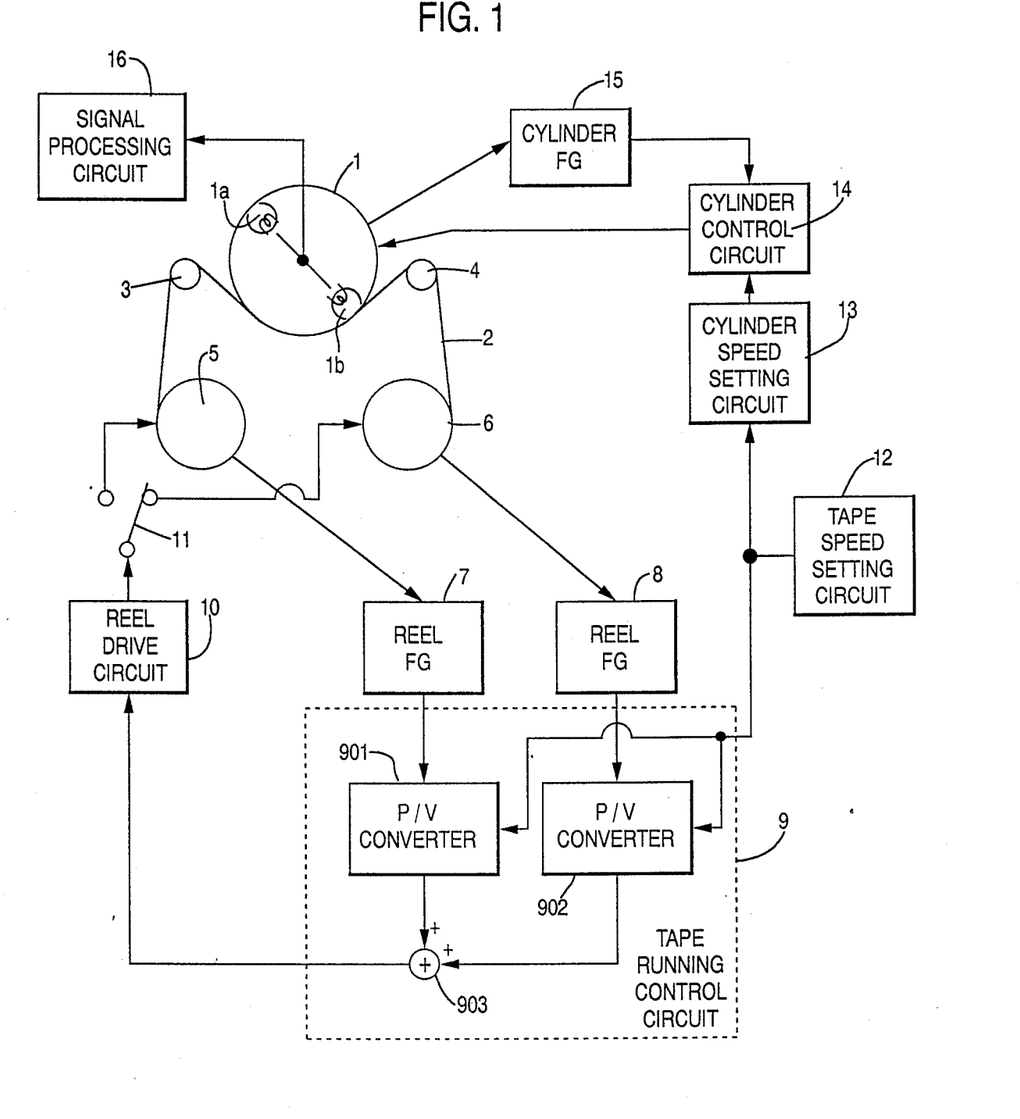
FIG. 1 is a block diagram of a first embodiment according to this invention.

FIG. 1 is a block diagram showing a magnetic tape reproducing apparatus in accordance with an embodiment of this invention. In this figure, element 1 is a rotary cylinder; elements 1a and 1b are heads; element 2 is a magnetic tape; elements 3 and 4 are posts forming a running path of the tape; elements 5 and 6 are reels; elements 7 and 8 are reel frequency generators (reel FG) used to detect the rotational speeds of the reels 5 and 6, respectively; element 9 is a tape running control circuit comprising period/voltage converters ("P/V converter" hereinafter) 901 and 902 and an adder 903; element 10 is a reel drive circuit; element 11 is a switch to change over the driven reel; element 12 is a tape speed setting circuit; element 13 is a cylinder speed setting circuit; element 14 is a cylinder control circuit; element 15 is a cylinder FG acting as a cylinder speed detector, and element 16 is a signal processing circuit for processing a read-out signal from the heads.

The embodiment in FIG. 1 arranged as described above functions as follows.

The tape speed setting circuit 12 may actually comprise a microcomputer or the like and sets an operating point of the cylinder control circuit 14 through the cylinder speed setting circuit 13 and operating points of the P/V converters 901 and 902. The tape speed setting circuit 12 can change these operating points to various conditions. The cylinder control circuit 14 causes the cylinder 1 rotate at a constant speed using the output of the cylinder FG 15 and based on the operating point which has been set up. That is, the rotating speed of the cylinder 1 can be changed to various speeds according to the operating point set by the tape speed setting circuit 12.

The frequency of the output signal of the cylinder FG 15 corresponds to the rotational speed of the rotary cylinder 1, or the period of the output signal of the cylinder FG 15 corresponds to the cycle of the rotation of the rotary cylinder 1 and thus is proportional to the reciprocal of the rotational speed. The periods of the output signals of the reel FGs 7 and 8 correspond to the rotational cycles of the reels 5 and 6, respectively, and thus are proportional to the reciprocals of the rotational speeds of the reels 5 and 6, respectively. The running speed of the tape 2 can be represented by the reciprocal of the sum of the periods of the output signals of the reel FGs 7 and 8. Therefore, to keep constant the sum of the periods of the two reel FG output signals means to keep constant the tape running speed.

The rotating speeds of the reel 5 and 6 are detected by the reel FGs 7 and 8 and the frequencies of their output signals are respectively converted to voltage signals by the P/V converters 901 and 902. The voltage outputs of the P/V converters 901 and 902 are added by the adder 903 and the added signal is applied to the reel drive circuit 10. The drive circuit 10 drives either the reel 5 or 6 selected by the switch 11 to run the tape 2. This reel control system can maintain the sum of the periods of the periodic output signals from the reel FGs 7 and 8 constant to run the tape at a constant speed. Here, since the operating points of the P/V converters 901 and 902 can be changed by the tape speed setting circuit 12, the tape speed can be changed to various speeds by the tape speed setting circuit 12.

The rotational speed of the cylinder 1 is controlled so that the speed component in the track direction recorded on the tape of each of the heads 1a and 1b are the same as those used for the normal reproduction mode by the cylinder speed setting circuit 13 corresponding to the tape speed set by the tape speed setting circuit 12. Therefore, the signal processing circuit 16 can correctly read output signals of the heads 1a and 1b.

If the tape speed setting circuit 12 changes the tape speed in a step-wise fashion with a small variation width, the track direction speed component of each head will not deviate significantly from the desired condition even in the transition situation when the tape speed and cylinder speed are changing, so that the data on the track can be reliably read out in the transition situation.

The above operation will be explained in more detail with reference to FIGS. 2 to 6b.

Figure 2:
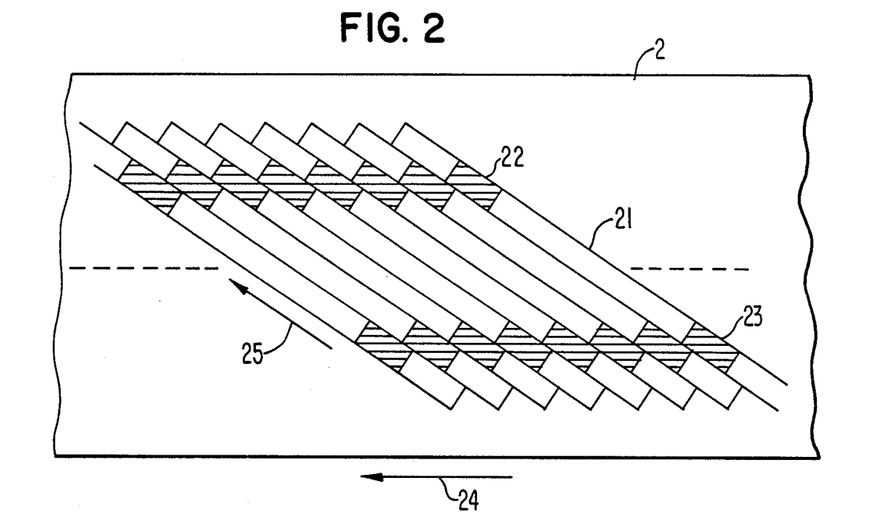
FIG. 2 is a diagram of an example of a track pattern recorded on a magnetic tape used for an apparatus according to this invention.

FIG. 2 is an example of recorded track pattern on the magnetic tape 2, in which element 21 is a track; elements 22 and 23 are tape position information recorded areas on the track 21; element 24 is a tape running direction, and element 25 is the head moving direction during recording and normal reproduction.

Figure 3:
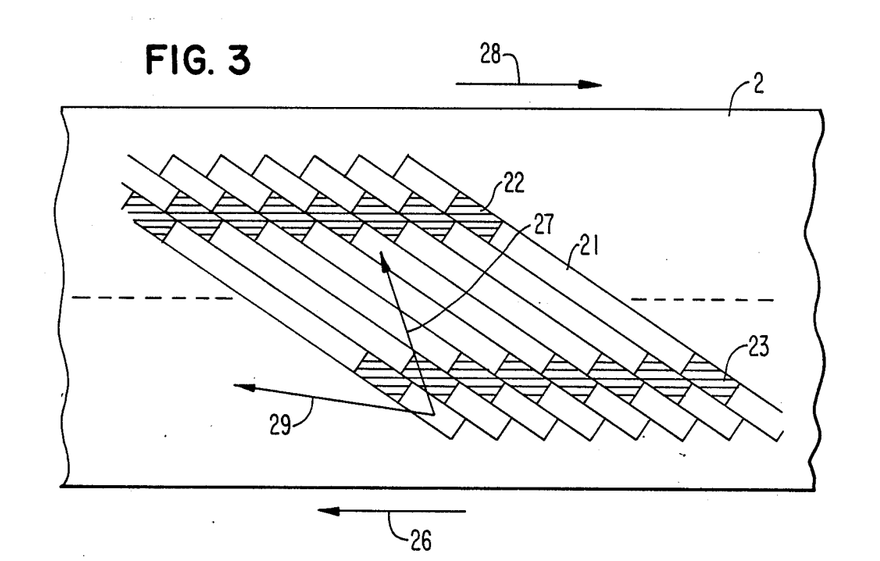
FIG. 3 is a diagram showing an operation of the head in the first embodiment according to this invention.

FIG. 3 shows a condition where the tape as shown in FIG. 2 is running at a higher speed than that used in the normal reproduction mode. In FIG. 3, element 26 is a vector showing the tape running direction when the tape is running at high speed in the same direction as that used in the normal reproduction mode (called the "FF" mode); element 27 is a vector showing the moving direction of the head during the FF mode; element 28 is a vector showing the tape running direction when it is running at a high speed in the reverse direction to that in the normal reproduction mode (called the "REW" mode), and element 29 is a vector showing the head moving direction during the REW mode.

When the tape is made to run at a speed which is 100 times faster than that used in the normal reproduction mode, it is impossible to rotate the cylinder at a speed which is 100 times faster than its normal speed. As shown in FIG. 3, on the other hand, when the tape is made to run at a high speed, the head moving direction slants with respect to the direction of the track 21 unless the cylinder is rotated at a proportionately high speed to that of the tape.

Figure 4:
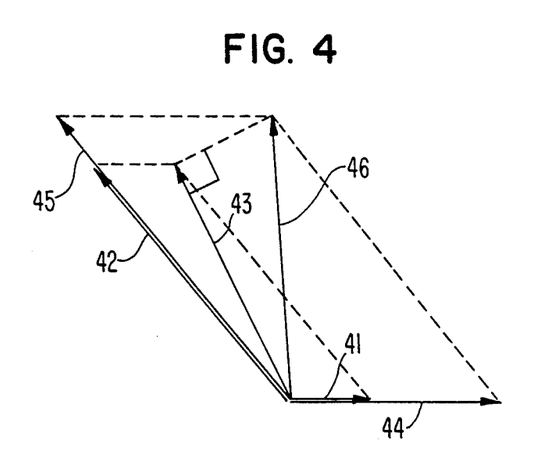
FIGS. 4, 5, 6a and 6b are explanatory operational diagrams of the embodiment of FIG. 1.

FIG. 4 shows the track direction speed component of the head moving speed in the FF mode, in which element 41 is a vector showing the tape running speed relative to the head moving speed in the normal reproduction mode (reverse to the actual tape running direction); element 42 is a vector showing the head moving speed when the tape running is ignored; element 43 is a vector showing the head moving speed relative to the tape running speed in the normal reproduction mode; element 44 is a vector showing the tape running speed relative to the head moving speed in the FF mode; element 45 is a vector showing a desired head moving speed in the FF mode when the tape running is ignored, and element 46 is a vector showing the head moving direction relative to the tape running speed in the FF mode.

Naturally vector 43 is a composite vector of vectors 41 and 42 and the vector 46 is a composite vector of vectors 44 and 45. Here the desired head moving vector 45 is set so that the magnitude of the component of vector 46 in the direction of vector 43 coincides with the magnitude of vector 43. Therefore, the track direction speed component of the head coincides with that in normal reproduction mode even in the FF mode, so that it is possible to read data in the tape position information areas 22 and 23 on the track. The same thing can be said in the REW mode.

It is the rotational speed of the cylinder that determines the head movement. A proper cylinder rotational speed with respect to a tape speed for maintaining a constant track direction speed component of the head is determined by a certain relationship as explained below.

Figure 5:
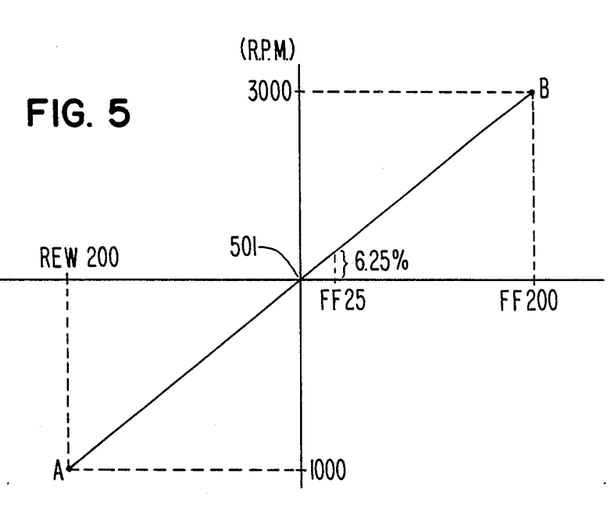

FIG. 5 is a diagram showing an example of the relationship between the cylinder rotational speed and the tape speed.

In FIG. 5, the abscissa indicates the tape speed, element 501 is the normal tape speed in the normal reproduction mode; FF200 is the 200 fold speed in the FF mode, and REW200 is the 200 fold speed in the REW mode. The ordinate indicates the cylinder rotational speed (r.p.m.).

As shown in FIG. 5, the cylinder rotational speed is 2000 r.p.m. in the normal reproduction mode, about 3000 rpm at the 200 fold tape speed in the FF mode, and 1000 rpm at the 200 fold tape speed in the REW mode. The cylinder rotational speed at a tape speed between those two points of REW200 and FF200 is obtained as a value on the line connecting points A and B.

FIG. 5 shows also the variation rate of the track direction speed component of the head when the tape speed is changed while the cylinder speed is kept constant, or vice versa. For instance, when the tape is running at the 200 fold speed in the FF direction while the cylinder speed is kept at 2000 r.p.m., the variation is obtained as follows:

$$(3000-2000)/2000=0.5$$

That is, a variation of 50% is caused. However, at the 25 fold speed in the FF direction, the variation is as follows:

$$50\times(25/200)=6.25\%$$

Therefore, when the operable (signal readable) range of the signal processing circuit 16 in FIG. 2 is ±10% in terms of variation in the signal frequency, the position information on the tape can be read reliably irrespective of the increase in the tape speed within 25 fold. It is the same when the tape speed is changed at steps of 25 fold such as from 25 to 50 fold, from 50 to 75 fold, and so on.

Figure 6A:
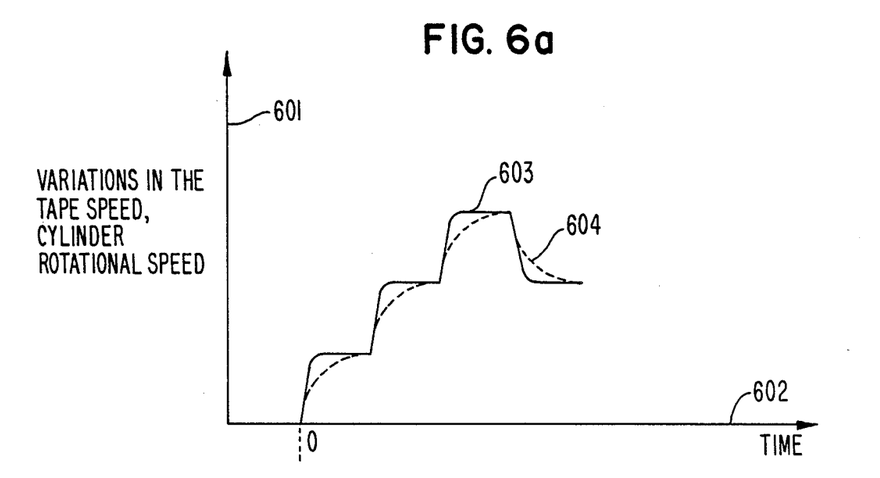
Figure 6B:
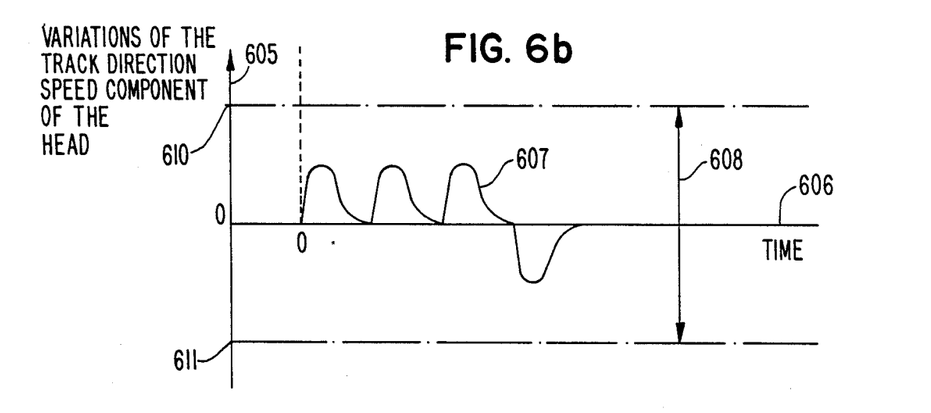

FIGS. 6a and 6b show variations of the tape speed, cylinder rotational speed, and track direction speed component of the head when the tape speed is changed by small steps by the tape speed setting circuit 12.

In FIG. 6a, element 602 is the time axis; element 601 is the ordinate axis showing the variations in the tape and cylinder rotational speeds; element 603 is the variation of the cylinder rotational speed, and element 604 is the variation of the tape speed. In FIG. 6b, element 606 is the time axis, element 605 is the ordinate axis showing the variation of the track direction speed component of the head; element 607 is the variation of the track direction speed component of the head; elements 610 and 611 are the operable limits of the signal processing circuit, and element 608 is the operable range of the signal processing circuit.

When a target tape speed is set by the tape speed setting circuit 12, the tape speed changes towards the target tape speed as shown by curve 604. The cylinder speed setting circuit 13 receives an instruction corresponding to the target tape speed from the tape speed setting circuit 12 and sets up a rotational frequency obtained by the relationship shown in FIG. 5 so that the cylinder control circuit 14 controls the cylinder 1 to cause the cylinder rotational speed variation 603. For the purpose of explanation, variations in the tape speed and cylinder rotational speed are shown by using the same scale in FIG. 6a, although actual values are different.

As shown in FIGS. 6a and 6b, the transition conditions of the tape speed and cylinder rotational speed up to their respective target values are not coincident with each other. When the tape speed and cylinder rotational frequency change in this way, the track direction speed component of the head also change naturally as shown by the curve 607 in FIG. 6b. When the variation width of the variations in the track direction speed component of the head 607 is within the range 608 between the operable limits 610 and 611 of the signal processing circuit 16, the position information on the tape can be reliably read. For instance, when the tape speed is changed by steps of 20 or 25 fold, the position information on the tape can be reliably read as described above.

Figure 7:
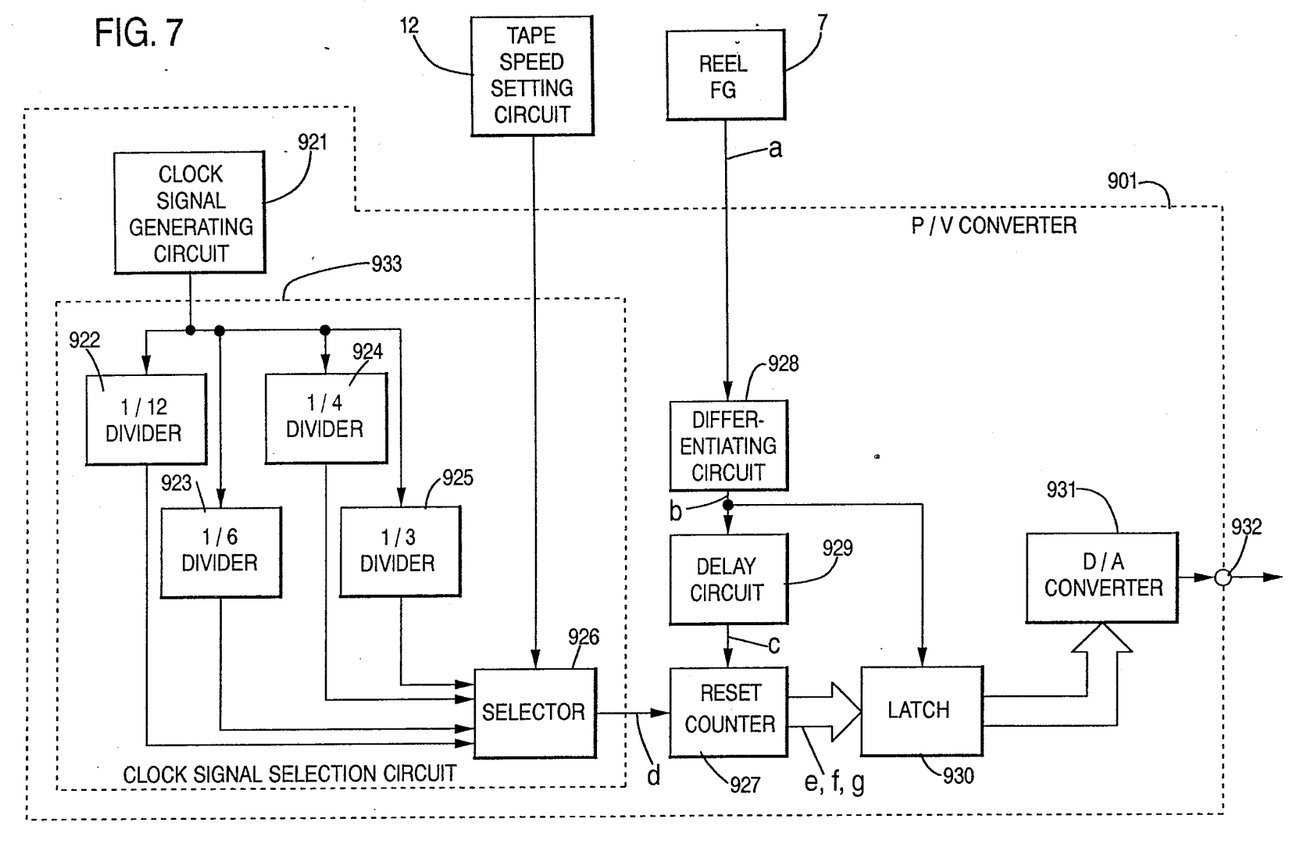
FIG. 7 is a block diagram of an example of a PV converter in the first embodiment according to this invention.
Figure 8A:
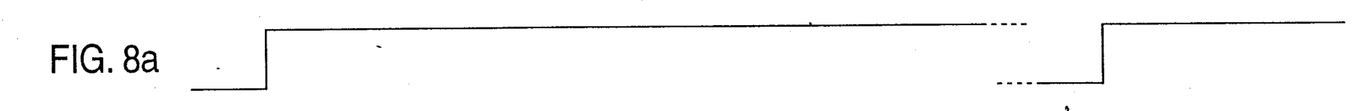
FIG. 8 consisting of parts a–g, is an operational waveform diagram of FIG. 7.
Figure 8B:
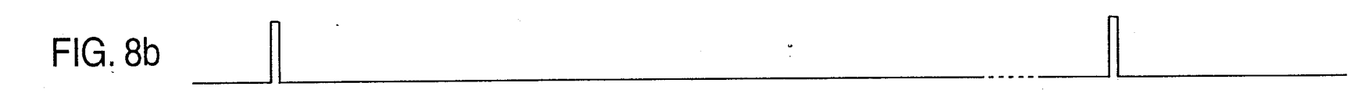
Figure 8C:
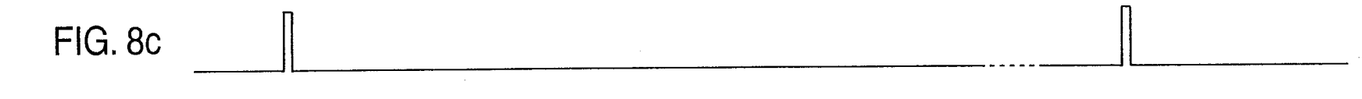
Figure 8D:
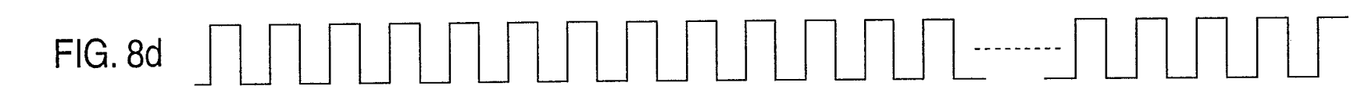
Figure 8E:
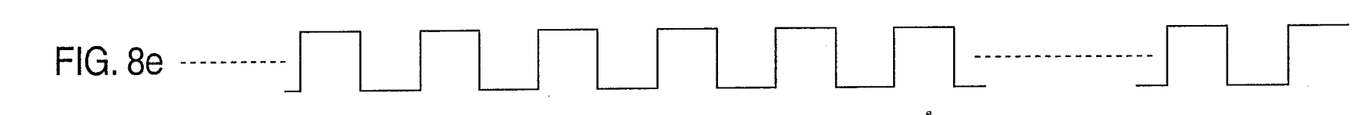
Figure 8F:
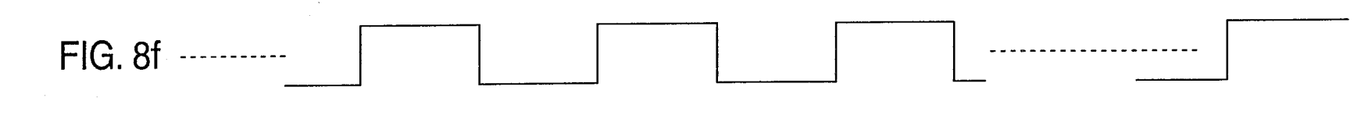
Figure 8G:
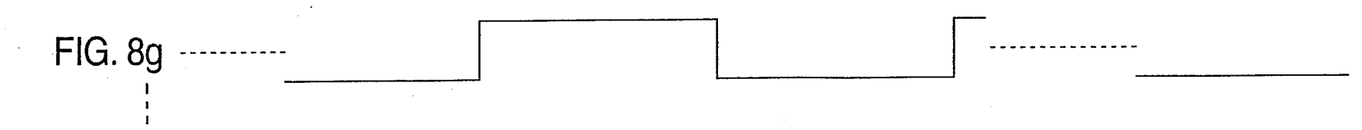

FIG. 7 shows a favorable example of the P/V converter 901 in the embodiment of FIG. 1. The P/V converter 902 also has the same configuration. FIG. 8 shows the operational waveforms a through g at positions a through g in FIG. 7.

In FIG. 7, element 921 is a clock signal generating circuit; element 922 is a 1/12 frequency divider; element 923 is a 1/6 frequency divider; element 924 is a 1/4 frequency divider; element 925 is a 1/3 frequency divider; element 926 is a selector; element 927 is a pulse counter; element 928 is a differentiating circuit; element 929 is a delay circuit; element 930 is a latch; element 931 is a D/A (digital to analog) converter, and element 932 is an output terminal of the P/V converter 901. Element 933 is a clock signal selection circuit comprising the frequency dividers 922 through 925 and the selector 926.

The clock signal generating circuit 921 generates a clock signal of a constant frequency, which is applied to the frequency dividers 922, 923, 924 and 925 to be divided by 1/12, 1/6, ¼ and ⅓, respectively. One of the output signals from the four frequency dividers is selected by the selector 926. That is, the clock signal selection circuit 933 selects one of the four types of clock signals. The selector 926 selects one of the clock signals according to a command supplied from the tape speed setting circuit 12. The pulse counter 927 counts pulses of the signal selected by the clock signal selection circuit 933. The waveform d in FIG. 8 shows an example of the output signal of the clock signal selection circuit 933, and e, f, g, . . . show output states of the pulse counter 927.

In FIG. 7, the input signal a shown in FIG. 8 supplied from the reel FG 7 is differentiated at its rising edge by the differentiating circuit 928 to become a pulse signal b shown in FIG. 8. The output of the pulse counter 927 is latched by the latch 930 in response to the pulse signal b, and the data latched by the latch 930 is converted into an analog signal by the D/A converter 931 and outputted through the output terminal 932. On the other hand, the delay circuit 929 delays the pulse signal b for a very short time to obtain a delayed pulse signal c, which clears the pulse counter 927. Therefore, the pulse counter 927 is cleared immediately after a rising edge of the output signal of the reel FG 7, and the data obtained by counting the pulses of the selected clock signal until the next rising edge is latched by the latch 930 at the next rising edge.

In other words, an analog voltage proportional to the period of the output signal of the reel FG 7 is obtained at the output terminal 932, that is, the period is converted to a voltage.

In addition, the clock signal fed to the pulse counter 927 is changed into 4 types by the tape speed setting circuit 12 and their frequency ratio is 1:2:3:4. Therefore, the operating frequency of the reel FG in a stable condition doubles when the output of the 1/6 frequency divider 923 is selected, triples when the output of the ¼ frequency divider 924 is selected, and quadrupules when the output of the ⅓ frequency divider 925 is selected, compared to the frequency when the output of the 1/12 frequency divider 922 is selected. In other words, the tape speed can be set at 4 different speeds with integral ratios of 1, 2, 3 and 4.

At this time, by setting the frequency of the clock signal generating circuit 921 so that the tape speed is 25 fold when the output of the 1/12 frequency divider 922 is selected, the tape speed which can be set by the tape speed setting circuit 12 becomes 25, 50, 75, or 100 fold. Thus, the tape position information on the tape can be reliably read.

The tape speed setting method can also be realized by dividing the frequency of the output of the reel FG instead of the clock signal generating circuit of this embodiment.

Figure 9:
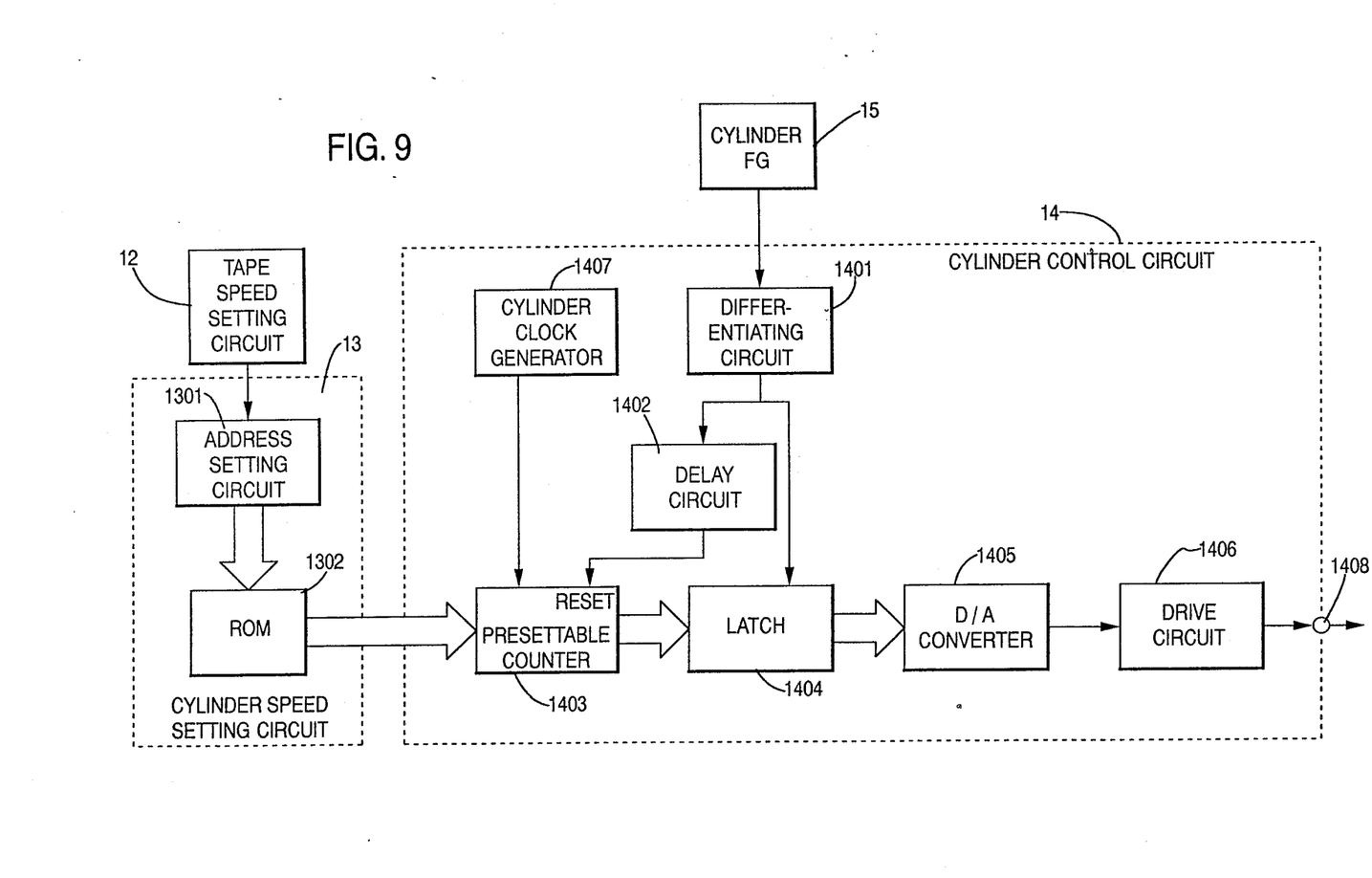
FIG. 9 is a block diagram of an example of a cylinder speed setting circuit and a cylinder control circuit in the first embodiment according to this invention.

FIG. 9 shows an example of a configuration of the cylinder speed setting circuit 13 and cylinder control circuit 14 in the embodiment of FIG. 1.

In FIG. 9, element 1302 is a read only memory ("ROM"); element 1301 is an address setting circuit for generating the address of the ROM; element 1401 is a differentiating circuit; element 1402 is a delay circuit; element 1403 is a presettable counter; element 1404 is a latch, 1405 a D/A converter; element 1406 is a drive circuit; element 1407 is a cylinder clock generator, and 1408 an output terminal of the cylinder control circuit 14. In the cylinder control circuit 14, the differentiating circuit 1401, delay circuit 1402, latch 1404, and D/A converter 1405 operate in the same way as the differentiating circuit 928, delay circuit 929, latch 930, and D/A converter 931 of the P/V converter 901. Therefore, a detailed description of them has been omitted.

ROM 1302 stores preset data for the presettable counter 1403 equivalent to the desired rotational speed of the cylinder having the relationship to the tape speed as shown in FIG. 5. When the tape speed setting circuit 12 sets a running speed of the magnetic tape 2, the address setting circuit 1301 generates an address of ROM 1302 from the output of the tape speed setting circuit 12. Data in the ROM designated by the address is outputted to the presettable counter 1403.

On the other hand, the differentiating circuit 1401 generates a pulse at a rising edge of the output signal of the cylinder FG 15. In response to this pulse, the latch 1404 latches the count value of the presettable counter 1403. The same pulse is delayed for a very short time by the delay circuit 1402. In response to the delayed pulse, the presettable counter 1403 presets the output data of the ROM 1302. Then the presettable counter 1403 counts the clock pulses generated by the cylinder clock generator 1407 until the next rising edge of the output signal of the cylinder FG 15 comes.

Since the drive circuit 1406 always operates by keeping the same condition, the output value of the presettable counter 1403 latched by the latch 1404 in a stable condition is approximately constant irrespective of the data presets by the ROM 1302. Therefore, the period of the output signal of the cylinder FG 15 in the stable condition of the cylinder is determined by the preset value set up by the ROM 1302. Since data corresponding to desired rotating speeds of the cylinder in accordance with FIG. 5 are stored in the ROM 1302, the rotational speed of the cylinder can be adjusted to properly correspond to the speed which is set up by the tape speed setting circuit 12.

Figure 10:
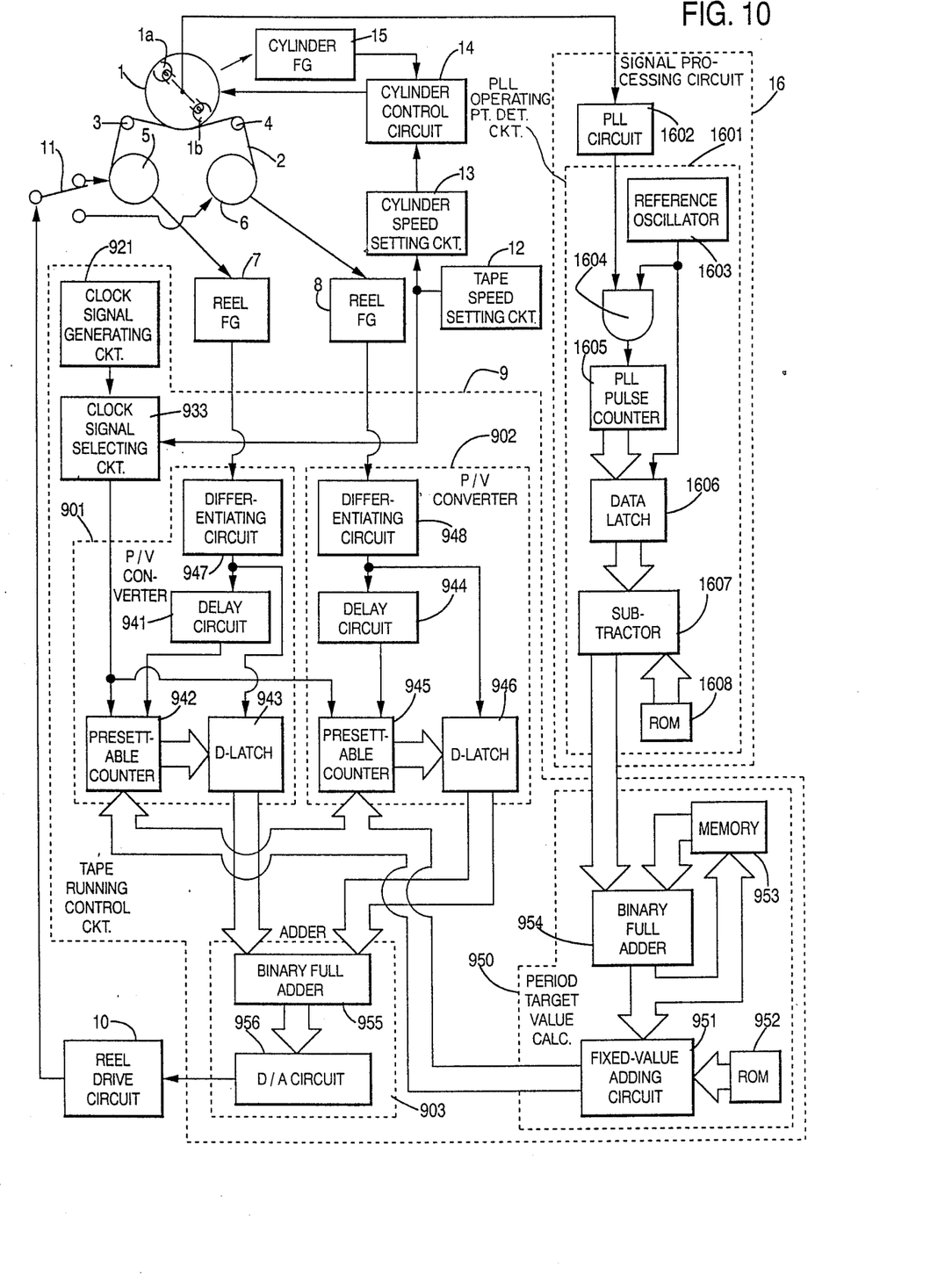
FIG. 10 is a block diagram of a second embodiment according to this invention.

FIG. 10 shows a magnetic tape reproducing apparatus in accordance with a second embodiment of this invention.

In FIG. 10, elements 947 and 948 are differentiating circuits; elements 941 and 944 are delay circuits; elements 942 and 945 are presettable counters; elements 943 and 946 are D-latches; element 921 is a clock signal generating circuit; element 933 is a clock signal selection circuit; element 955 is a binary full adder; element 956 is a D/A converter; element 952 is a ROM; element 951 is a fixed-value adding circuit; element 953 is a memory; element 954 is a binary full adder; element 1602 is a PLL (phase locked loop) circuit; element 1603 is a reference oscillator; element 1604 is an AND circuit; element 1605 is a PLL (phase locked loop) pules counter; element 1606 is a data latch; element 1608 is a ROM, and element 1607 is a subtractor. Element 950 is a period target value calculating circuit comprising the ROM 952, fixed-value adding circuit 951, memory 953, and binary full adder 954.

The P/V converter 901 comprises the differentiating circuit 947, delay circuit 941, presettable counter 942, and D-latch 943. The P/V converter 902 comprises the differentiating circuit 948, delay circuit 944, presettable counter 945, and D-latch 946. The adder 903 comprises the binary full adder 955 and D/A converter 956. The tape running control circuit 9 comprises the P/V converter 901, P/V converter 902, period target value calculating circuit 950, adder 903, clock signal generating circuit 921 and clock signal selection circuit 933. Here, the clock signal generating circuit 921 and clock signal selection circuit 933 function in the same way as those shown in FIG. 7. Element 1601 denotes a PLL operating point detecting circuit comprising the PLL circuit 1602, reference oscillator 1603, AND circuit 1604, PLL pulse counter 1605, data latch 1606, ROM 1608, and substractor 1607. The signal processing circuit 16 includes the PLL circuit 1602 and PLL operating point detecting circuit 1601.

In FIG. 10, one of a plurality of clock signals generated by the clock signal generating circuit 921 is selected by the clock signal selection circuit 933 according to the output of the tape speed setting circuit 12 in the same way as in the example shown in FIG. 7. The P/V converter 901 counts the pulses of the selected clock signal during a period of the output signal of the reel FG 7, i.e., from a rising edge of the output signal of the reel FG 7 to the next rising edge. The P/V converter 902 functions in the same way for the output signal of the reel FG 8. The output data of the PV converters 901 and 902 are digitally added by the binary full adder 955, and then converted by the D/A converter 956 to an analog signal, which is outputted to the reel drive circuit 10.

The driving load is almost constant and the output of the D/A converter 956 remains approximately constant under a stable condition. Therefore, a control loop is composed to keep constant the sum of the periods of the output signals of the reel FGs 7 and 8 through the reel drive circuit 10.

Here, the preset values of the presettable counters 942 and 945 are given by the period target value calculating circuit 950 to change the operating points. In other words, when the preset values are made large, differences from the operation stabilizing values of the presettable counters 942 and 945 decrease, and as a result, the cycles of the reel FGs 7 and 8 become short and stable. That is, the reel rotating speed increases and thus the tape speed increases.

The process steps until the period target value calculating circuit 950 outputs the preset value is described below.

The output signal of the head 1a or 1b is amplified by a head amplifier (not illustrated) and then inputted to the PLL circuit 1602. The PLL circuit 1602 outputs an oscillator signal synchronized with the head output signal. The reference oscillator 1603 periodically generates high level pulses each having a predetermined duration. The AND circuit 1604 passes the oscillator signal of the PLL circuit 1602 only during the duration of each of the high level pulses from the reference oscillator 1603, and the pulses of the passed signal are counted by the PLL pulse counter 1605. The count result of the PLL pulse counter 1605 is latched by the data latch 1606 at the falling edge of each of the high level pulses from the reference oscillator 1603.

Thus, data showing how many waves were outputted from the PLL circuit 1602 during the predetermined duration of each high level pulse is stored in the data latch 1606. The ROM 1608 constantly outputs a data showing the number of waves that the PLL circuit 1602 should output in normal reproduction mode. The subtractor 1607 calculates the difference between the number of waves actually outputted from the PLL circuit 1602 and the output of the ROM 1608. The output of the subtractor 1607 becomes the output of the PLL operating point detecting circuit 1601.

In other words, the PLL operating point detection circuit 1601 calculates a deviation of the actual operating frequency of the PLL circuit 1602 from the desired operating frequency of the PLL circuit 1602 and outputs the result. All of the above processing is performed based on digital data.

In the period target value calculating circuit 950, such an operation is repeated at intervals which are equal to or longer than one cycle of the cylinder 1 such that the output data of the PLL operating point detecting circuit 1601 and an output data of the memory 953 are added by the binary full adder 954 and the resultant data rewritten into the memory 953. The ROM 952 stores a minimum value of digital data required as the preset values for the presettable counters 942 and 945. A constant value given by the ROM 952 is added to the output of the binary full adder 954 by the fixed-value adding circuit 951, and the result becomes the output of the period target value calculating circuit 950. That is, the tape running speed is finely adjusted by the output of the period target value calculating circuit 950 until the output data of the PLL operating point detecting circuit 1601 becomes 0, when the value of the memory 953 is renewed.

Figure 11:
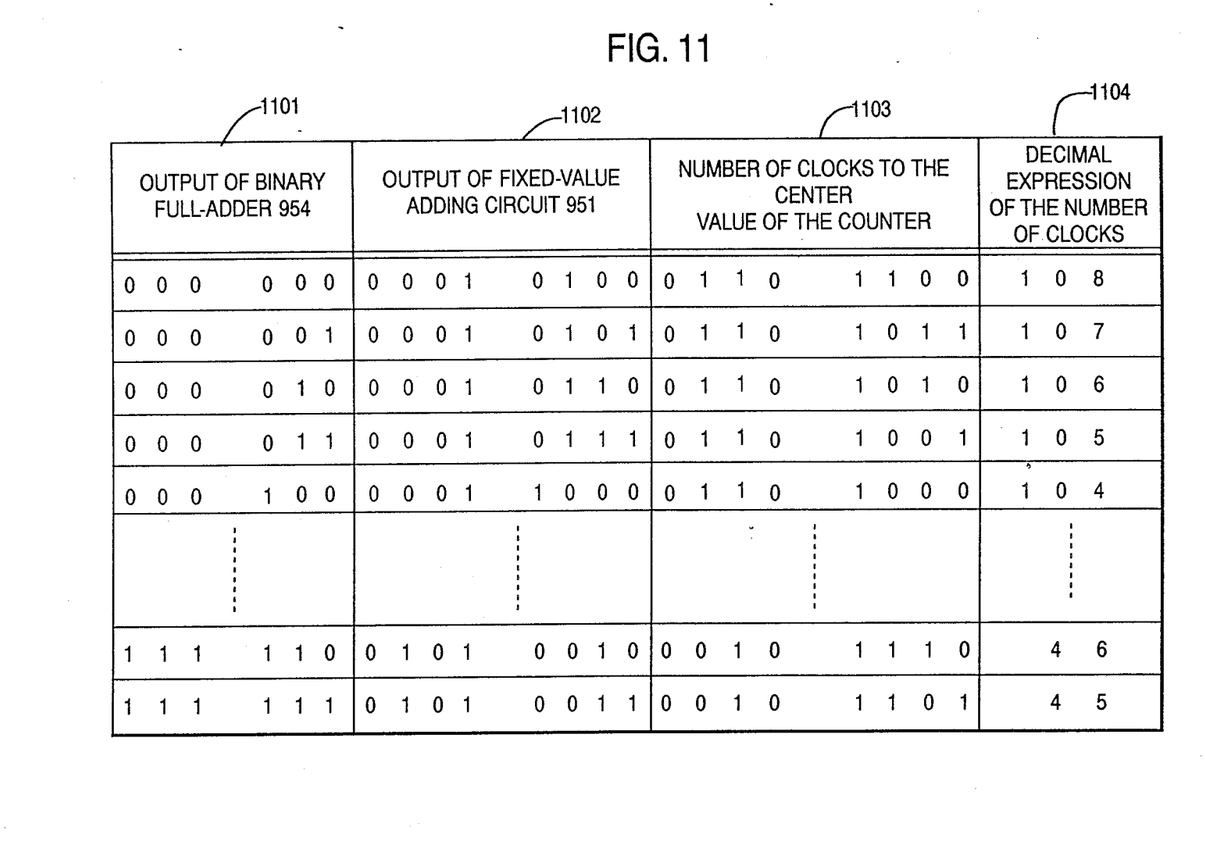
FIG. 11 is an explanatory operating diagram of the embodiment of FIG. 10.

FIG. 11 shows the preset values of the presettable counters 942 and 945 and the reel FG cycle target values in terms of the count clock values of the presettable counters 942 and 945 when the output of the binary full adder 954 is assumed 6-bit digital data. The number of settable tape speed is equal to the number of this reel FG cycle target values.

The output of the binary full adder 954 has 64 values from "000000" to "111111" as shown in column 1101 on the table in FIG. 11. Assuming the ROM value to be "010100" and the number of bits of the output of the fixedvalue adding circuit 951 be 8 bits, the output of the fixedvalue adding circuit 951 is as shown in column 1102. (Here, the lower 6 bits are added.) Assuming the number of bits of each of the presettable counters 942 and 945 to be also 8 bits, the number of clocks from the preset value of each of the presettable counters 942 and 945 to the center value of the counter is as shown in column 1103. Here, the center value of the counter is "10000000". When the values in column 1103 are expressed by a decimal number, the results are as shown in column 1104.

Since the target value of the sum of the periods of the reel FG output signals is twice the values in column 1104, the number of clocks varies from 90 to 216. Since the tape speed is proportional to the reciprocal value of the sum of the periods of the reel FG output signals, the tape speed for clock number 90 is 216/90=2.4 times the tape speed for clock number 216.

Thus, the tape speed can be set up to 64 equally divided speeds between 1 and 2.4 based on the 64 outputs of the binary full adder 954. The data stored in the memory 953 in the period target value calculating circuit 950 has one of the above described 64 values so that the output data of the PLL operating point detecting circuit 1601 becomes 0.

Therefore, even if the tape length or tape thickness is changed, the deviation of the tape speed due to such changes can be adjusted.

As will be known from the above description, since the ROM 1608 and ROM 952 may store only one kind of data, it is clear that these ROMs may be replaced by more simple elements such as DIP switches.

As described above, according to this invention, tape position information recorded on the tracks can be read precisely while the magnetic tape is running at high speed. Especially even in the transition stage when the tape running speed increases, the tape position information can be correctly read to enable a high speed search. By detecting the track direction speed component of the head from the reproduced signal frequency from the head to adjust the tape speed, a more reliable search becomes possible.

This invention was explained above according to preferred embodiments, but it is unnecessary to say that the applications of this invention are not limited to the embodiments described above. For example, the recording tape is not limited to magnetic tape, but other tapes employing optical recording techniques, or magneto-optical recording techniques, etc. may be used.

What is claimed is:

1. An apparatus having a reproducing head mounted on a rotary cylinder for reproducing signals recorded in slanting tracks on a recording tape including a tape position information recorded at a specified area on each track, and operable in a normal reproduction mode in which said tape runs at a normal tape speed and said rotary cylinder rotates at a normal rotational speed so that said reproducing head moves in a direction of each track to reproduce all signals recorded in each track and in a high speed search mode in which said tape runs at a predetermined high speed which is higher than said normal tape speed by a first ratio and said rotary cylinder rotates at a predetermined high rotational speed which is higher than said normal rotational speed by a second ratio which is smaller than said first ratio so that said reproducing head moves in a direction crossing a plurality of tracks to reproduce only a part of signals including said tape position information, said apparatus comprising:

a cylinder rotation detector for producing a periodic output signal corresponding to a rotational speed of said rotary cylinder;

two reels on which said tape is wound;

two reel rotation detectors for respectively producing periodic output signals corresponding to rotational speeds of said two reels;

a reel drive means for driving either one of said two reels so as to run said tape;

a tape speed setting means for selectively setting a plurality of tape speeds between said normal and high tape speeds and for outputting an output signal indicative of each set one of said plurality of tape speeds;

a tape running control means for outputting a drive signal to said reel drive means according to said output signals from said two reel rotation detectors and said output signal from said tape speed setting means so that said tape runs at the speed set by said tape speed setting means;

a cylinder speed setting means for setting a rotational speed of said rotary cylinder within a range between said normal and high rotational speeds such that a track direction speed component of said head is kept constant according to said output signal from said tape speed setting means and for outputting an output signal indicative of the set rotational speed;

a cylinder control means for controlling said rotary cylinder according to said output signal from said cylinder rotation detector and said output signal from said cylinder speed setting means so that said rotary cylinder rotates at the speed set by said cylinder speed setting means; and a signal processing circuit for reading information picked up by said head from said tape;

wherein, during a transition state in which the tape speed is changed from one of said normal and high tape speeds to another of said normal and high tape speeds, said tape speed setting means sets said plurality of tape speeds sequentially to change the tape speed in a stepwise manner so that a deviation of the track direction speed component of said head in each step of change of the tape speed is within a range in which said signal processing circuit can correctly read said tape position information.

2. An apparatus according to claim 1, wherein said tape running control means comprises:

two period-to-voltage conversion means for converting periods of the respective periodic output signals from said two reel rotation detectors to two voltage signals according to said output signal from said tape speed setting means; and an adding means fro adding said two voltage signals to obtain said drive signal.

3. An apparatus according to claim 2, wherein each of said period-to-voltage conversion means comprises:

a clock signal generating means for generating a plurality of clock signals having different frequencies from one another and for outputting one of the plurality of clock signals according to the output signal from said tape speed setting means;

a counter for counting clocks of the output clock signal from said clock signal generating means;

a latch circuit for latching a count output of said counter at intervals of time corresponding to the period of the periodic output signal from corresponding one of said two reel rotation detectors;

a latch pulse generating circuit for generating a latch pulse for said latch circuit from the periodic output signal from the corresponding one of said two reel rotation detectors;

a reset pulse generating circuit for generating a reset pulse from said latch pulse for resetting said counter; and a digital to analog converter for converting a latched output of said latch circuit to an analog signal which is one of said two voltage signals.

4. An apparatus according to claim 1, wherein said cylinder speed setting means comprises:

a memory storing therein a plurality of rotational speed data corresponding to a plurality of rotational speeds of said rotary cylinder for keeping the track direction speed component of said head constant; and an address setting circuit for outputting an address for said memory according to the output signal from said tape speed setting means so that said memory outputs one of said plurality of rotational speed data, and said cylinder control means comprises:

a clock signal generator for generating a clock signal;

a presettable counter which presets the output rotational speed data from said cylinder speed setting means and counts clocks of the clock signal from said clock signal generator;

a latch circuit for latching a count output of said counter at intervals of time corresponding to the period of the periodic output signal from said cylinder rotation detector;

a latch pulse generating circuit for generating a latch pulse for said latch circuit from the periodic output signal from said cylinder rotation detector;

a preset pulse generating circuit for generating a preset pulse from said latch pulse for presetting the rotational speed data from said cylinder speed setting means to said counter;

a digital to analog converter for converting a latched output of said latch circuit into an analog signal; and a drive circuit for driving said rotary cylinder according to said analog signal.

5. An apparatus for reproducing signals recorded in slanting tracks on a recording tape including a tape position information recorded at a specified area on each track, comprising:

a rotary cylinder having a reproducing head mounted thereon;

a cylinder rotation detector for producing a periodic output signal corresponding to a rotational speed of said rotary cylinder;

two reels on which said tape is wound;

two reel rotation detectors for respectively producing periodic output signals corresponding to rotational speeds of said two reels;

a signal processing circuit for processing signals picked up by said head from said tape;

a reel drive means for driving either one of said two reels so as to run said tape;

a tape speed setting means for selectively setting a plurality of tape speeds and for outputting a signal indicative of one of said plurality of tape speeds;

a period target value calculating means for producing a period target value from an output signal from said signal processing circuit;

a tape running control means for outputting a drive signal to said reel drive means according to said period target value, said output signals from said two reel rotation detectors and said output signal from said tape speed setting means so that said tape runs at a speed which is modified from the speed set by said tape speed setting means according to said period target value;

a cylinder speed setting means for setting a rotational speed of said rotary cylinder such that a track direction speed component of said head is kept constant according to said output signal from said tape speed setting means and for outputting an output signal indicative of the set rotational speed; and a cylinder control means for controlling said rotary cylinder according to said output signal from said cylinder rotation detector and said output signal from said cylinder speed setting means so that said rotary cylinder rotates at the speed set by said cylinder speed setting means.

6. An apparatus according to claim 5, wherein said tape running control means comprises:

a clock signal generating means for generating a plurality of clock signals and outputting one of said plurality of clock signals according to said output signal from said tape speed setting means;

a first presettable counter which presets said period target value and counts clocks of the output clock signal from said clock signal generating means during a first interval corresponding to the period of the periodic output signal from one of said two reel rotation detectors;

a first latch circuit for latching a count output of said first presettable counter at the end of said first interval;

a second presettable counter which presets said period target value and counts clocks of the output clock signal from said clock signal generating means during a second interval corresponding to the period of the periodic output signal from the other of said two reel rotation detectors;

a second latch circuit for latching a count output of said second presettable counter at the end of said second interval;

an adder for adding latched outputs of said first and second latch circuits; and a digital to analog converter for converting an added output of said adder to an analog signal which is said drive signal.

7. An apparatus according to claim 5, wherein said signal processing circuit has:

a phase locked loop circuit for producing an oscillation signal synchronized with a signal picked up by said head from said tape; and a phase locked loop operating point detecting circuit for detecting a difference of the number of waves of the oscillation signal from a predetermined number of waves and outputting a difference value indicative of said difference as said output signal of said signal processing circuit.

8. An apparatus according to claim 7, wherein said period target value calculating means comprises:

a first memory and a first adder, said first adder adding said difference value outputted from said signal processing circuit with a value stored in said first memory, an added output value of said first adder being written into said first memory;

a second memory storing a predetermined fixed value; and a second adder for adding the added output value of said first adder with said predetermined fixed value to obtain said period target value.

* * * * *